Sept. 27, 1938. J. A. RICH 2,131,672
BERRY AND FRUIT PICKING APPARATUS
Filed Aug. 6, 1936 3 Sheets-Sheet 1
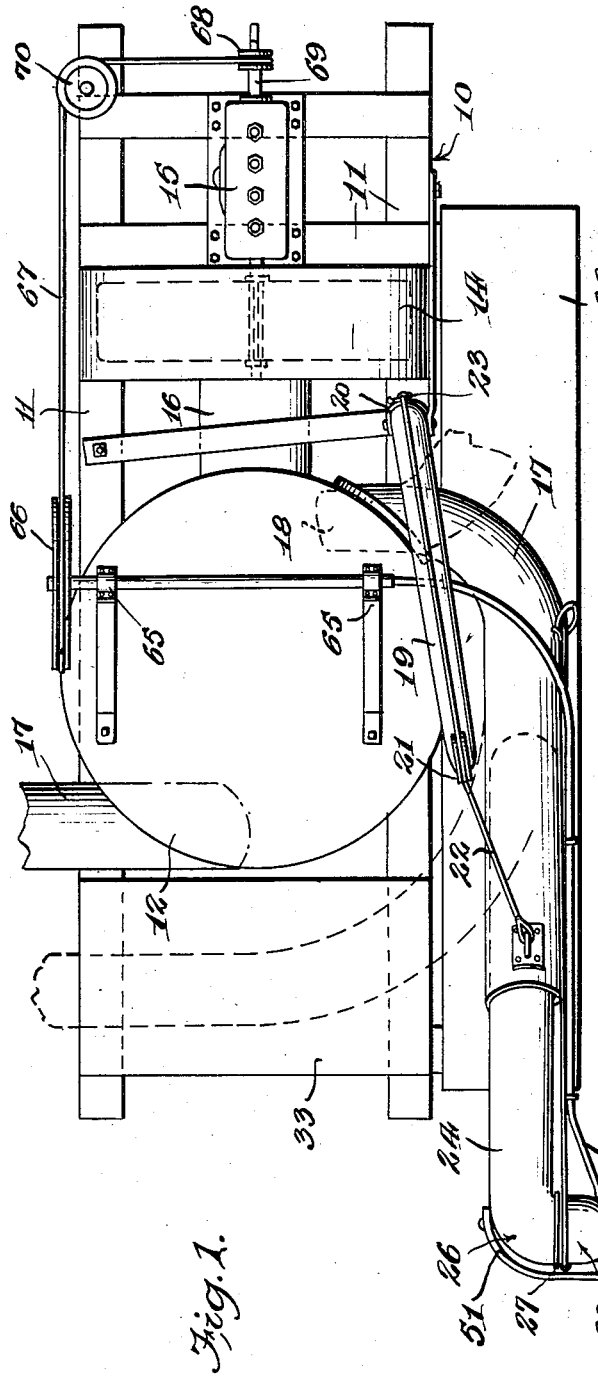
Inventor
John A. Rich,
By Christian R. Nielsen
Attorney

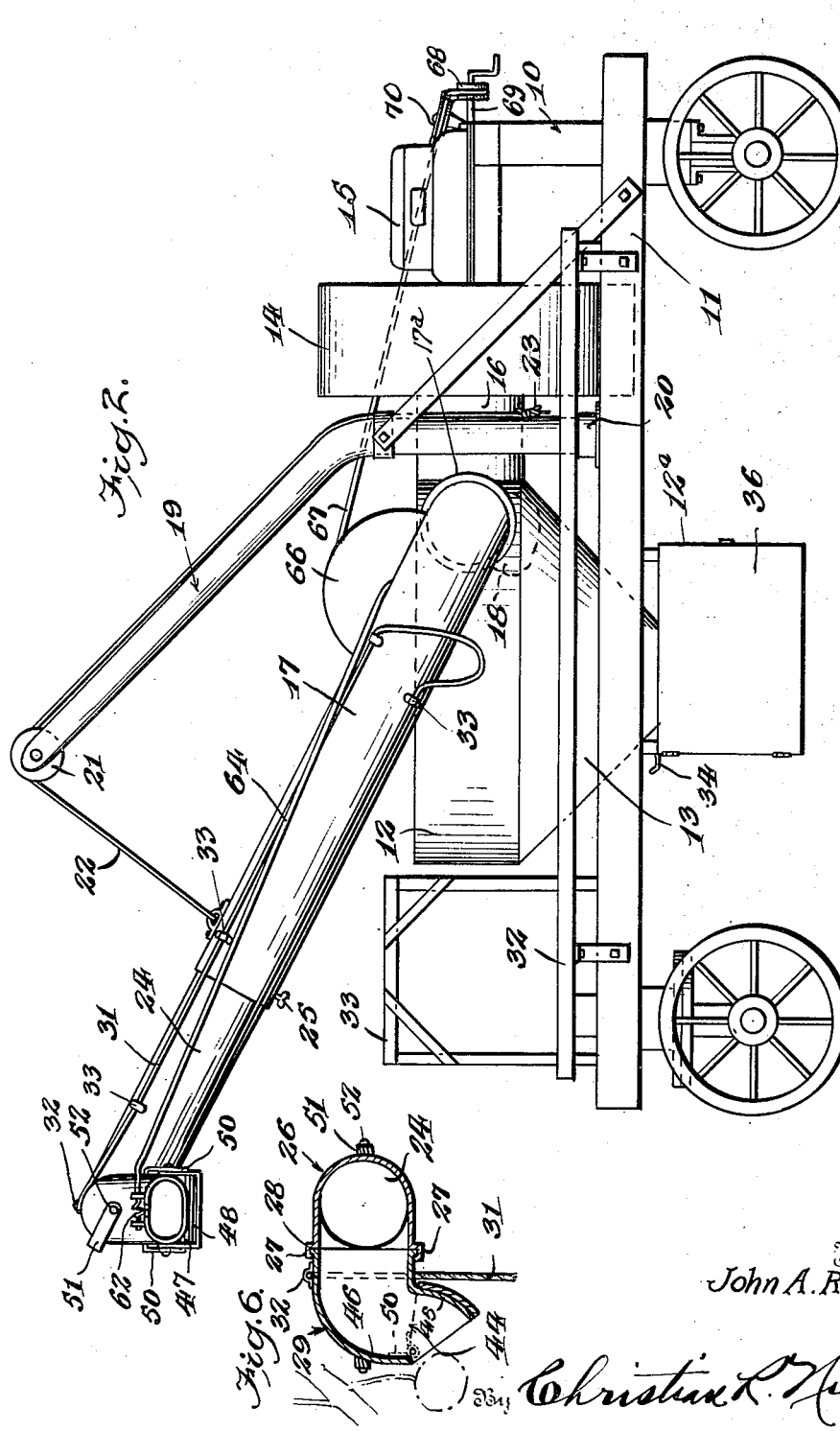

Sept. 27, 1938.  J. A. RICH  2,131,672
BERRY AND FRUIT PICKING APPARATUS
Filed Aug. 6, 1936   3 Sheets-Sheet 3
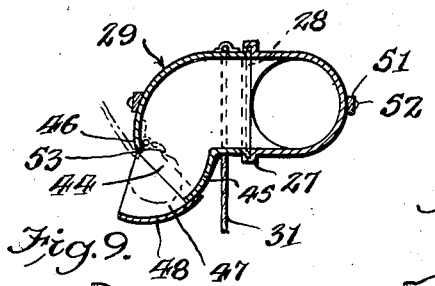
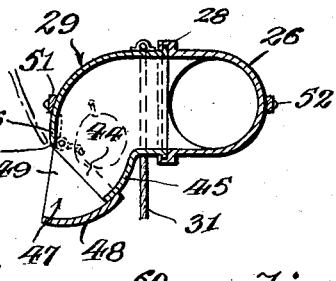
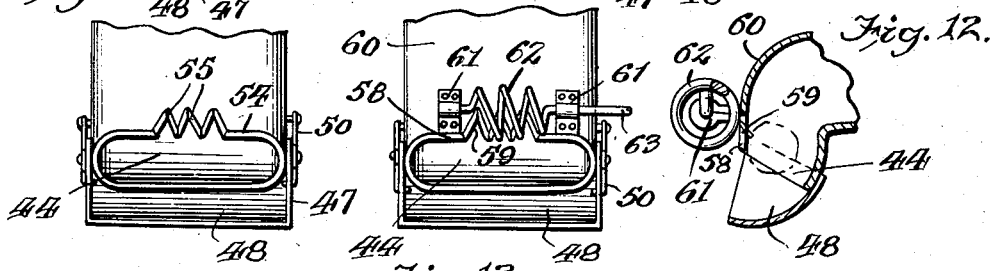
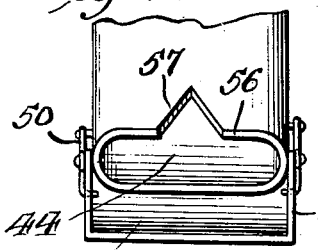
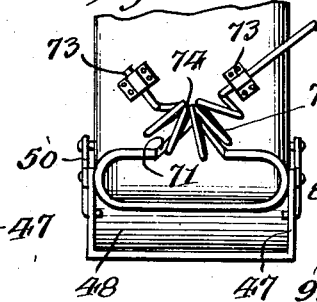
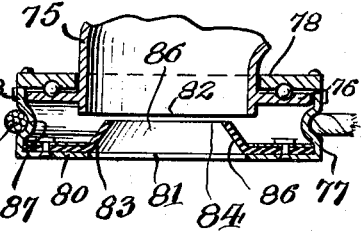
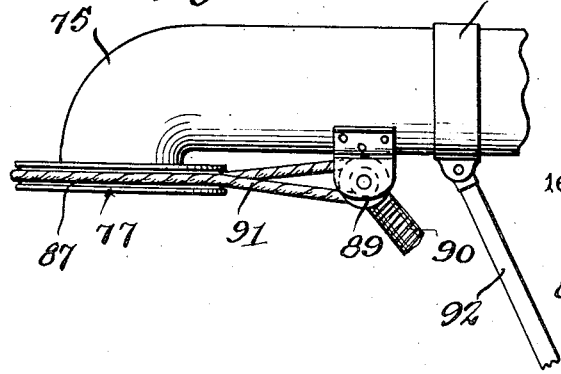
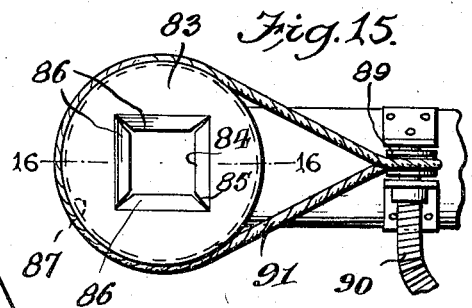
INVENTOR
John A. Rich,
BY
Christian R. Nielsen.
ATTORNEY Patented Sept. 27, 1938

2,131,672

UNITED STATES PATENT OFFICE 2,131,672

BERRY AND FRUIT PICKING APPARATUS

John A. Rich, Prairie du Sac, Wis.

Application August 6, 1936, Serial No. 94,671

15 Claims. (Cl. 56—328)

This invention relates to an apparatus and method for picking fruit, berries and the like and it consists in the constructions, arrangements and combinations herein described and claimed.

It is a cardinal purpose of the invention to provide an apparatus for picking fruit, berries and the like, by creating a suction upon the fruit or berry to detach the same from its supporting branch and conducting the fruit or berry to a suitable depository.

It is also an object of the invention to provide such structure which may be readily transported through fields or orchards, and also includes picker heads which may be actuated in close proximity to the ground or overhead, as the case may be.

It is a further object of the invention to provide novel constructions of picker heads embodying means for severing the stem of the fruit or berry.

It is a still further object of the invention to provide a picker head construction which may be readily adjusted to assume various positions in order to satisfactorily enclose the fruit or berry for action of the suction means.

Additional objects, advantages and features of invention will be apparent from the following description and accompanying drawings, wherein—

Figure 1 is a top plan view of a machine constructed in accordance with my invention.

Figure 2 is a side elevation thereof.

Figure 3 is a vertical sectional view of the receiving hopper and depository supporting means.

Figure 4 is a similar view illustrating the loaded position of the depository.

Figure 5 is a similar view illustrating a modified form thereof.

Figure 6 is a sectional view through a picker head.

Figures 7 and 8 are similar views illustrating the positions of the fruit or berry during various stages of movement into the picker head.

Figure 9 is a front elevation of a modified form of picker head.

Figure 10 is a similar view of a further form thereof.

Figure 11 is a modified form of head in which a power driven stem-severing mechanism is involved.

Figure 12 is a vertical sectional view thereof.

Figure 13 is a front elevation of a modification thereof.

Figure 14 is a still further form of the picker head.

Figure 15 is a top plan view thereof.

Figure 16 is a sectional view of the line 16—16 of Figure 15.

Attention is now invited particularly to Figures 1 and 2 of the drawings wherein I have illustrated an ambulant conveyance 10, which may be of a draft type or may include suitable self-contained power means, as desired, and further may be composed of any suitable frame structure such as indicated at 11.

Intermediate the length of the frame 11 there is mounted, in any suitable manner, a collector 12, entirely closed upon its sides and upper end, the discharge 13 preferably having a conical formation and terminating in a depository chute 12' positioned within a chamber 12a, suspended from the frame 11.

Suitable air-suction means 14 is mounted upon the frame 11, which may be of customary standard construction of the desired capacity, and driven from a source of power 15, which in the present instance, is illustrated as an internal combustion motor. The suction means 14 is connected with the collector by a pipe 16, so that upon operation of the suction means 14, a suction will be created in the collector as well as collector pipes or conduits, as will be presently described.

As shown, a collector pipe 17 opens upon the interior of the collector 12 journalled in a collar 17a, and preferably the pipe extends into the collector a short distance, and as may be seen in Figure 2, the pipe has a slight downward inclination as indicated at 18, to more readily discharge material conveyed by the pipe, into the collector.

The pipe 17 is of a flexible character, but must be of ample strength to withstand the suction created therethrough without collapse of the walls thereof, which might hinder passage of material therethrough.

A derrick 19 is revolubly mounted in a foot 20, upon the frame 11, extending a substantial distance above the collector 12, and preferably inclined at its upper end, and upon the extremity thereof, a pulley 21 is mounted. A cable 22 is trained upon the pulley 21, one end being attached to a forward position of the collector pipe 17, while the opposite end of the cable is secured to a cleat fixed to the derrick adjacent its base. From the foregoing it will be understood that the derrick normally supports the pipe 17, and that the derrick and pipe may be swung in a horizontal plane as a unit, to varying positions with respect to the collector 12. Also, it will be seen that the elevation of the pipe may be varied through manipulation of the cable 22.

It will, of course, be understood that any suitable number of pipes 17 may be incorporated with the collector, and each will be provided with supporting means, such as the derrick, 19, if, and as found necessary.

A section of pipe 24 is telescopically arranged within the outer end of the pipe 17 and may be secured in various extended positions by a clamp generally indicated at 25. The pipe 24 terminates in an elbow 26 having an annular channel 27 within which there is seated an annular rib 28 of a picker-head 29 (see Figs. 6-7 and 8). Thus, it will be seen that the head 29 is rotatable within the channel 27, and in order that the head 29 may be rotated to position the mouth in proximity of fruit or the like to be picked, an endless cable 31 is fixed to the head by a clamp 32, the free end of the cable being located adjacent the base of the pipe 17. The respective reaches of the cable are supported slidably by guides 33 located at spaced points upon the pipes 17 and 24. It will thus be seen that upon a pull of one reach of the cable 31, the head 29 will be rotated in one direction, and upon exerting a pull upon the other reach of the cable the head will be rotated in an opposite direction.

The movement of the collector pipe 17 will be controlled by an operator, and to facilitate the operation, suitable platforms, 32—33 are provided. The platform 32 extends longitudinally of the conveyance 10 slightly elevated above the frame 11, while the platform 33 extends transversely of the frame, and of such height as to enable an operator to readily move the collector pipe into the tops of trees as the conveyance is moved along. In addition to the up and down movements of the collector pipe, it will be seen that the derrick 19 may be oscillated to permit oscillatory movements of the collector pipe. Further, it will be possible to move the collector pipe 17—24 independently of the derrick, by flexing action, as indicated by dotted lines in Figure 1. It will of course be understood that the platforms 32—33 may be dispensed with and permanently secured ladders may be employed, or other means may be found desirable for facilitating the handling of the collector pipe.

With further reference to the collector pipe 17—24, it should be noted that the sections constituting the same are telescopically arranged so that its length may be varied readily, and that the sections may be of an entirely rigid metallic structure, or may comprise a rigid lower section and flexible outer sections.

While the description has perhaps conveyed the thought that the collector pipe is operated at heights above the conveyance, it should be understood that the collector pipe may be and is constructed for picking of berries or fruits such as raspberries, blackberries, strawberries, gooseberries, and the like, as well as cucumbers and similar vegetables, which, as generally known grow close to the ground, and picking of these will be permitted by the flexibility of the collector hose, the only requirement being the use of the proper head, all of which will be more clearly defined hereinafter.

Obviously, the most efficient operation of the machine is accomplished by preventing the breaking of the partial vacuous or suction condition in the collector 12 and collector pipe 17—24, and therefore the discharge 13 of the collector 12 is provided with a manually actuated slide valve 34, which will be in closed position when the basket or other container 35 is removed from the chamber 12a. The chamber 12a is also of air-tight construction, preventing breaking of the suction in the collector 12, but will of course include a door 36 permitting ready removal of the basket. The baskets 35 are shown in Figures 3 and 4 as supported upon a resilient platform 37, and preferably the depository chute 12' is of a length to extend well into the basket while the latter is in its elevated position and by the combined functions of the platform 37 and the chute 12' the fruit when being deposited into the basket will be safeguarded against bruises, as would be the case if the fruit were permitted to fall directly from the discharge. As the basket 35 becomes filled, the weight of the fruit will cause compression of the spring 38, and the basket 35 will have a more or less horizontal position, as shown in Figure 5.

A further form of closure for the discharge of the collector 12 is shown in Figure 5, wherein the discharge 39 terminates in a semi-circular bearing housing 40 in which a drum 41 is revolubly mounted. The drum 41 fits snugly within the housing 40 and is provided with a plurality of peripheral pockets 42, which are successively presented to the discharge 39 for reception of fruit or other objects picked by the machine and are thence deposited into a basket 43 upon continued rotation of the drum. By this construction, it will be thus seen that the breaking of the partial vacuous or suction action created in the collector and associated collector pipes is not permitted at the time of discharge of the fruit.

Various modifications of the picker heads have been illustrated in the drawings which will now be described in detail, attention being directed first to Figures 6, 7 and 8. The head 29 has a mouth 44, which is of somewhat less diameter than the pipe 24, the lower wall 45 being arcuate and stopping a distance outwardly of the upper wall 46. From the construction set forth it will be seen that the lower wall 45 underlies the mouth 44 and will readily catch and direct the fruit into the suction pipe, but in order to further this function, a swinging hood 47 is provided adjacent the mouth, as will now be described.

The hood 47 comprises a main body portion 48 shaped to conform to the lower wall 45 and is oscillatable to projected and retracted positions with respect to the forward edge of the wall 45. The retracted position being shown in Figure 6 while the projected position is illustrated in Figures 7 and 8. A pair of leg members 49 spaced to straddle the head 29 are formed integrally with the body member 48, the legs being pivoted to respective sides of the head, and in order to hold the hood 47 in normal projected position, a spring 50 is provided. Any suitable spring may be employed, and that shown includes a helix intermediate its ends, respective ends being secured to the hood 47 and a portion of the head 29. Thus, the hood 47 is mounted so that upon presentation of the hood against a branch of a tree or other obstruction, the hood will be moved to retracted position so as to present the mouth of the picker into proper picking relation of the fruit, and as soon as the stem of the fruit has been severed or broken and the picker-head moved away from the obstruction, the hood 47 will quickly swing outwardly under action of the spring 50 to a position beneath the falling fruit and thus insure entrance of the fruit into the suction pipe 24.

It is contemplated that the channel 27 and rib 28 of the picker head will afford ample support for the head 29 but, if desired, a band 51, pivotally secured at its ends as at 52, may be provided. As clearly shown in Figure 6, one end of the band 51 is secured to the outer wall of the head 29, and the other end of the band is secured to the opposite wall of the collector pipe 24. Thus, the band 51 will have a substantially U-shape, and preferably the bight portion thereof will be spaced clear of contact with the head 29 and pipe 24, so that interference will not be encountered upon rotation of the head upon manipulation of the cable 31.

In operation of the heads shown in Figures 6, 7 and 8, the breaker edge 53 of the upper wall of the head acts to give an abrupt bend to the stem of the fruit. This will be brought about in substantially the following manner. When the fruit is positioned in line with the mouth 44 of the head, as shown in Figure 6, the fruit will be drawn abruptly inward within the mouth with the stem resting against the edge 53 of the head due to the suction created in the pipes 24—17. (See Figure 7.) It will now be noted that the fruit will be given an upward angular pull against the edge 53 sufficient to break the stem, allowing the fruit to pass through the collector pipes 17—24, to the collector 12, and is finally deposited in the basket 35. It will be understood that the head 29 may be readily rotated by the cable 31 to position the head at suitable angles with respect to the fruit to be picked so that the proper relation between the breaker edge 53 and the stem may be insured.

In Figures 9 to 13 variations of the picker head are shown. The head 29 is substantially the same as previously described with the exception of the "breaker edge" and therefore like characters have been employed to designate like parts. The edge 54, as shown in Figure 9 comprises a plurality of serrations 55 at the medial portion thereof, which will engage the stem positively, and prevent slippage of the stem during breaking action. In Figure 10 the edge 56, includes a single V-shaped serration 57 disposed in the medial portion of the edge 56. In both of these forms it will be noted that the base of the serrations 55 and 57 is located a substantial distance inwardly of their respective edges 54—56, permitting the fruit to assume a position well within the mouth of the picker head before severing action of the stem occurs.

The head shown in Figure 9 is well suited for picking of fruit found growing in bunches or clusters, such as cherries, while the head shown in Figure 10 has been found highly efficient in the picking of fruit growing singly, although this latter form will also function admirably upon clustered fruit, by virtue of the wide formation of the mouth of the serration which will readily permit entrance of numerous stems therewithin.

In Figures 11, 12, and 13, there is shown a positive cutter mechanism which cooperates with serrations of the picker head, and attention is now invited to these figures for an understanding of the operation, and particularly Figures 11 and 12. The edge 58 is formed with a plurality of serrations 59, similar to those shown in Figure 9, and upon the upper portion 60 of the head there are mounted a pair of bearings 61. The bearings 61 are spaced upon opposite sides of the serrations 59, and as may be seen in Figure 12, project forwardly of the wall portion 60, and have revolubly journalled therein a cutter member 62. The cutter 62 is shown, in the present instance, as a screw or helical worm formed from suitable wire, the helices of which operate in conjunction with respective serrations 59. The cutter 62 projects from one of the bearings as at 63 for connection with a flexible drive shaft 64 (see Figs. 1 and 2). The shaft 64 is driven by suitable means from the power plant 15, and as shown the shaft is housed in bearings 65 secured upon the top of the collector 12. A pulley 66 is fixed to the shaft 64, and a drive 67 is trained about the pulley 66 and a pulley 68 keyed to the crank shaft 69 of the engine 15. Suitable guide pulleys 70 may be employed as required.

In the use of this form of head, when the fruit is drawn thereinto by the action of the air suction, the stem will be carried into a serration as well as between two turns of the screw, where the action of the revolving screw will force the stem against the apex of the serration. Obviously, an abrupt bend is given the stem which results in separation of the fruit from the plant or tree. Should it be desirable to cut the stems of the fruit, the edges of the serrations may be provided with cutting edges.

In Figure 13, a single serration 71 is shown, and mounted thereabove I provide a worm 72, driven by the flexible shaft 64 as previously described. The worm 72 is formed of suitable spring steel wire, and of such character as to be flexed to assume an arc, the widest space between the helices being presented forwardly, and immediately overlying the serration. The bearings 73 in this instance, must be set at an angle to each other, and maintain the helices of the worm in proper relation to the serration.

In use, the stem is gripped by the helices adjacent the apex of the serration, or at the closed portions of the helices, indicated at 74, and obviously a pulling action will be exerted, as will be required in picking of some fruits.

Certain fruits have very short stems, making it difficult to effect a bending or severing action to the stem (the peach, as an illustration), and in Figures 14 to 16 inclusive, I have shown a construction in which the fruit is given a twisting action. Attention is directed to these figures for an understanding of the construction and operation.

The head, generally indicated at 75, includes an annular circumscribing flange 76 upon which a revoluble shell 77 is mounted. The shell 77 has an inwardly turned flange 78 disposed immediately over the flange 76 and between these two flanges a ball race or other suitable anti-friction means 79 is housed, permitting the shell to be freely rotated about the head 75. The shell 77 also includes a face plate 80 extended in a plane parallel with the flange 78 and is centrally apertured, as at 81, and aligned with the mouth 82 of the head 75. Upon the inner portion of the plate 80 a rubber disk 83 is secured and this disk has an aperture 84, aligned with the mouth 82. The aperture 84 is shown in the present instance as of square formation and from each corner of the aperture the disk 83 is cut as at 85, thereby defining four separate flap-like members 86 integrally and resiliently connected with the disk 83. As may be clearly seen in Figure 16, the flap-like members 86 are arranged at an inclination to one another having an appearance of a truncated cone, the apex of which would be disposed well within the mouth 82 of the head.

An annular groove 87 is formed in the wall 88 of the shell and rearwardly upon the body of the head 75, a pulley 89 is journalled and driven by a flexible shaft 90. A driving belt 91 is trained around the groove 87 and the pulley 89, and with rotation of the flexible shaft 90 it will be seen that the shell 77 may be rotated in either direction.

In use of this form of head, the head is moved to a position where the flap-like members contact the fruit, and with the shell 77 rotating, the fruit will be given a twist and thereby break the stem of the fruit from its branch. The flap-like members, as previously stated, are of a resilient nature permitting their separate movements away from the fruit to allow its passage through the aperture 84 into the mouth 82 of the head, under action of suction created by the suction apparatus. Also, by providing the flap members at an inclination, various sized fruit will be accommodated and obviously in all cases, the necessary grip between the flaps and the fruit will be established to impart the necessary twist to the fruit. The aperture 84 is shown as square, but it should be understood that the aperture may have any shape found practical or desirable.

In order to manipulate the head 75, a pole 92 may be fixed to the head and in the present instance, this is accomplished by a clamp ring 93.

While I have shown and described certain preferred constructions this is illustrative only, for I am well aware that variations may be made, and I therefore consider as my own, all such modifications as fairly fall within the scope of the appended claims.

I claim:

1. In a suction picking apparatus for fruit and the like, an ambulant conveyance, a collector thereon, a collector pipe opening thereinto, rotatable derrick means upon the conveyance for supporting the collector pipe, a rotatably adjustable picker head upon the collector pipe, control means for adjusting the rotatable head, means for receiving fruit from the collector, and suction means connected with the collector and collector pipes.

2. In a suction picking apparatus for fruit and the like, a supporting structure, a collector mounted thereon, and having a depository chamber, fruit collector pipes associated with the collector, valve means controlling communication between the collector and depository chamber preventing breakage of suction in the collector in one position of the valve, a receptacle within the depository chamber for receiving fruit from the collector in another position of the valve, and means for creating a suction in the collector and collector pipes.

3. In a suction picking apparatus for fruit and the like, a supporting structure, a collector mounted thereon and having a depository chamber in the base thereof, collector pipes associated with the collector, said pipes being extensible and movable relative to the collector, a slide valve between the collector and depository chamber for controlling communication therebetween, a resiliently supported receptacle within the depository chamber for receiving fruit from the collector in one position of the valve and means for creating a suction in the collector and collector pipes.

4. In a suction picking apparatus for fruit and the like, a supporting structure, a collector mounted thereon and having a depository chamber in the base thereof, collector pipes associated with the collector, said pipes being extensible and movable relative to the collector, a rotary valve interposed between the collector and the depository chamber, said valve having peripheral pockets for reception of fruit discharged into the collector, a receptacle within the depository chamber for receiving fruit from the valve, and means for creating a suction in the collector and collector pipes.

5. In a suction picking apparatus for fruit and the like, a conveyance, a collector mounted thereon and having a depository chamber, collector pipes associated with the collector, said pipes including a pivotal section and an extensible outer section, a picker head adjustably mounted upon the outer section, remote means for adjusting the picker head, rotatable derrick means carried by the conveyance, means between the derrick and the pivotal section of the collector pipes for adjustably supporting the same, and means for creating a suction through the collector and collector pipes.

6. In a suction picking apparatus for fruit and the like, a conveyance, a collector mounted thereon and having a depository chamber, flexible collector pipes opening upon the collector, and having an extensible section, a picker head swivelly mounted upon the collector pipes, a cable secured to the head and terminating at a point remote thereto whereby said head may be moved to present the same into engagement with fruit to be picked, rotatable derrick means carried by the conveyance, adjustable cable means between the derrick and collector pipes for supporting the same, and means for creating a suction through the collector and collector pipes.

7. In a suction picking apparatus for fruit and the like, a conveyance, a collector mounted thereon and having a depository chamber, collector pipes opening upon the collector, suction means in communication with the collector and pipes, a picker head swivelly mounted upon the collector pipes, each head including a mouth and a breaker-edge, a cable secured to each head and terminating at a point remote thereto, whereby said head may be moved to present the mouth about the fruit and the stem thereof to the breaker edge for breaking said stem through action of suction upon the fruit.

8. In a suction picking apparatus for fruit and the like, a conveyance, a collector mounted thereon and having a depository chamber, a collector pipe opening upon the collector, suction means in communication with the collector and pipes, drive means on the conveyance for actuating the suction means, said drive means having a power take-off, a picker head swivelly mounted upon the collector pipe, said head including a mouth and a breaker edge, a cable secured to the head and terminating at a point remote thereto, whereby said head may be moved to present the mouth about the fruit and the stem thereof to the breaker edge under action of suction through the head, a severing mechanism carried by the head and cooperable with the breaker edge, and a flexible drive between the power take-off and the severing mechanism.

9. Mechanism for picking fruit and the like comprising a swivelly mounted head and means for rotating the same, said head having a fruit-receiving opening, one edge of the opening defining a stem breaker, suction means for drawing the stem of the fruit into engagement with the breaker edge, and a spring projected hood member mounted beneath the fruit-receiving opening.

10. Mechanism for picking fruit and the like comprising a swivelly mounted head and means for rotating the same, said head having a fruit-receiving opening, one edge of the opening defining a stem breaker, said edge having a serration medial of its length and extending inwardly of the opening, suction means for drawing the stem of the fruit into said serration, and a spring projected hood member mounted beneath the fruit-receiving opening.

11. Mechanism for picking fruit and the like comprising a swivelly mounted head and means for rotating the same, said head having a fruit-receiving opening, one edge of the opening defining a stem breaker, said edge having a plurality of serrations formed medially of its length and extending inwardly of the opening, suction means for drawing the stem of the fruit into said serrations, and spring projected hood member mounted beneath the fruit receiving opening.

12. Mechanism for picking fruit and the like comprising a head, said head having a fruit-receiving opening, one edge of the opening being serrated, a power-driven cutter mechanism mounted upon the head and cooperable with the serrated portion of the head for drawing the stem therewithin and suction means for drawing the fruit within the head.

13. Mechanism for picking fruit and the like comprising a head, said head having a fruit-receiving opening, one edge of the opening being serrated, a power driven cutter mechanism mounted upon the head, said cutter comprising a worm member cooperable with the serrated portion of the head for drawing the stem between the serrated portion and the convolutions of the worm, and suction means for drawing the fruit within the head.

14. Mechanism for picking fruit and the like comprising a rotatable head, means for rotating the same, said head having an opening, means for creating a suction through the head, and flexible fruit-engaging means projecting inwardly over said opening.

15. Mechanism for picking fruit and the like comprising a rotatable head, means for rotating the same, said head having an opening centrally thereof, frictional fruit-engaging means projecting inwardly over the opening, said friction means being flexible and expansible to permit passage of fruit therethrough and means for creating a suction through the head.

JOHN A. RICH.